(12) United States Patent
Park

(10) Patent No.: US 9,229,563 B2
(45) Date of Patent: Jan. 5, 2016

(54) FOLDABLE TOUCH SCREEN PANEL

(71) Applicant: Samsung Display Co., Ltd., Yongin, Gyeonggi-Do (KR)

(72) Inventor: Jung-Mok Park, Yongin (KR)

(73) Assignee: Samsung Display Co., Ltd., Yongin-Si (KR)

( * ) Notice: Subject to any disclaimer, the term of this patent is extended or adjusted under 35 U.S.C. 154(b) by 25 days.

(21) Appl. No.: 14/179,545

(22) Filed: Feb. 12, 2014

(65) Prior Publication Data

US 2015/0022732 A1 Jan. 22, 2015

(30) Foreign Application Priority Data

Jul. 16, 2013 (KR) ........................ 10-2013-0083579

(51) Int. Cl.
*G06F 3/041* (2006.01)
*G06F 3/044* (2006.01)
*G08C 21/00* (2006.01)

(52) U.S. Cl.
CPC ................ *G06F 3/041* (2013.01); *G06F 3/044* (2013.01)

(58) Field of Classification Search
None
See application file for complete search history.

(56) References Cited

U.S. PATENT DOCUMENTS

| 2011/0310053 | A1 | 12/2011 | Kim et al. | |
|---|---|---|---|---|
| 2012/0162099 | A1 | 6/2012 | Yoo et al. | |
| 2012/0318585 | A1 | 12/2012 | Kim et al. | |
| 2014/0205853 | A1* | 7/2014 | Funakubo et al. | 428/605 |

FOREIGN PATENT DOCUMENTS

| KR | 10-0911183 B1 | 7/2009 |
|---|---|---|
| KR | 10-2011-0090398 A | 8/2011 |
| KR | 10-2011-0137576 A | 12/2011 |
| KR | 10-1094635 B1 | 12/2011 |
| KR | 10-2012-0072793 | 7/2012 |
| KR | 10-2012-0138287 A | 12/2012 |
| KR | 10-2013-0005093 A | 1/2013 |
| KR | 10-2013-0013695 A | 2/2013 |
| WO | WO 2013047197 A1 * | 4/2013 |

OTHER PUBLICATIONS

KIPO Office action dated Jun. 27, 2014, for Korean priority Patent application 10-2013-0083579, (4 pages).
Korean Patent Abstracts for Korean Publication 1020100138167, dated Dec. 31, 2010, corresponding to Korean Patent 10-1094635, dated Dec. 20, 2011.
Korean Registration Determination Certificate dated Dec. 24, 2014 of the corresponding Korean Patent Application No. 10-2013-0083579, (6 pages).

* cited by examiner

*Primary Examiner* — Nicholas Lee
(74) *Attorney, Agent, or Firm* — Christie, Parker & Hale, LLP

(57) ABSTRACT

A foldable touch screen panel includes a thin film substrate including polymer resin, a sensing electrode part including a plurality of sensing electrodes patterned on a surface of the thin film substrate, and a metallic wiring part including a plurality of metallic wirings located outside the sensing electrode part and coupled to an end of the sensing electrodes, wherein the sensing electrode part includes a foldable area and a non-foldable area where at least a portion of the sensing electrode part is removed.

20 Claims, 4 Drawing Sheets

FOLDABLE TOUCH SCREEN PANEL

CROSS-REFERENCE TO RELATED APPLICATION

This application claims priority to and the benefit of Korean Patent Application No. 10-2013-0083579, filed on Jul. 16, 2013, in the Korean Intellectual Property Office, the disclosure of which is incorporated herein in its entirety by reference.

BACKGROUND

1. Field

One or more embodiments of the present invention relate to a foldable touch screen panel.

2. Description of the Related Art

Recently, demand for touch screen panels configured to receive information input by directly contacting a screen using a user's hand, a pen, or the like without use of a separate input device, such as a keyboard, a mouse, or the like, has rapidly grown. In particular, foldable touch screen panels have recently attracted attention in that the foldable touch screen panel is convenient to carry, and can embody a relatively large-sized screen, and accordingly, the foldable touch screen panel has been applied to not only mobile devices, such as cellular phones, portable multimedia players (PMPs), navigation devices, ultra mobile personal computers (UMPCs), e-books, e-newspapers, and the like, but has also been applied to other fields, such as TVs, monitors, and the like.

In existing touch screen panels, sensing electrodes for detecting an input position on a panel are formed of an indium tin oxide (ITO), which is a transparent conductive material.

A conventional touch screen panel will now be described in detail with reference to FIG. 1, which is a top view of a conventional touch screen panel. Referring to FIG. 1, the conventional touch screen panel may include a substrate 110, a sensing electrode part having a plurality of sensing electrodes 120 patterned on one surface or both surfaces of the substrate 110, and a metallic wiring part having a plurality of metallic wirings 130 formed outside the sensing electrode part and coupled to one end or both ends of the plurality of sensing electrodes 120. The conventional touch screen panel 100 may further include a connection part 140 that is located at an edge of one side of the substrate 110 and that couples the metallic wiring part to a circuit substrate.

Although the conventional touch screen panel 100 has good optical and electrical characteristics by applying an ITO to the plurality of sensing electrodes 120, the conventional touch screen lacks flexibility. Thus, an ITO having a high surface resistance and low flexibility is limited in achieving a sensing electrode pattern for foldable touch screen panels that are easily bent or folded.

SUMMARY

One or more embodiments of the present invention include a foldable touch screen panel that is flexibly folded in a designated area.

Additional aspects will be set forth in part in the description that follows and, in part, will be apparent from the description, or may be learned by practice of the presented embodiments.

According to one or more embodiments of the present invention, a foldable touch screen panel includes a thin film substrate including polymer resin, a sensing electrode part including a plurality of sensing electrodes patterned on a surface of the thin film substrate, and a metallic wiring part including a plurality of metallic wirings located outside the sensing electrode part and coupled to an end of the sensing electrodes, wherein the sensing electrode part is divided into a foldable area and a non-foldable area that remains by excluding the foldable area from the sensing electrode part.

The foldable touch screen panel may further include a connection part located at an edge of the thin film substrate for coupling the metallic wiring part to a circuit substrate.

The metallic wirings may be at the connection part and may be coupled to the circuit substrate in a folding axis direction of the foldable area.

A thickness of the thin film substrate may be about 0.01 mm to about 1 mm.

The polymer resin may include at least one of polycarbonate (PC), polyethylene terephthalate (PET), cyclicolefinpolymer (COP), plyethersulfone (PES), polyimide (PI), polyethylenenaphthalate (PEN), polyarylate (PAR), cross-linked epoxy, or cross-linked urethane.

The foldable touch screen panel may be configured to fold at the foldable area.

A bend of the foldable area, when folded, may have a radius of curvature of about 10 mm or less.

A surface resistance of each of the sensing electrodes at the foldable area may be about 500 Ω/sq or less.

The foldable area and the non-foldable area may include different materials.

The sensing electrodes at the non-foldable area may include indium tin oxide (ITO), and the sensing electrodes at the foldable area may include a flexible material.

The flexible material may include any one of a silver nanowire (AgNW), a carbon nanotube (CNT), or graphene.

The sensing electrodes at the non-foldable area may include ITO, and the sensing electrodes at the foldable area may include ITO stacked with a flexible material.

The flexible material may include any one of a silver nanowire (AgNW), a carbon nanotube (CNT), or graphene.

The sensing electrodes at the non-foldable area may include ITO, and the sensing electrodes at the foldable area may include a structure of ITO stacked with a flexible material with an overcoat layer therebetween.

The flexible material may include any one of a silver nanowire (AgNW), a carbon nanotube (CNT), or graphene.

The sensing electrodes at the non-foldable area may include ITO, and the sensing electrodes at the foldable area may include metal.

The sensing electrodes at the foldable area may include a mesh shape with fine wires of the metal.

Each of the fine wires may have a width of about 10 μm or less.

The metal may be any one of silver (Ag), aluminum (Al), copper (Cu), chromium (Cr), nickel (Ni), or molybdenum (Mo), or an alloy thereof.

The metallic wirings may be coupled to respective ones of the sensing electrodes.

BRIEF DESCRIPTION OF THE DRAWINGS

The above and/or other aspects will become apparent and more readily appreciated from the following description of the embodiments, taken in conjunction with the accompanying drawings, in which.

DETAILED DESCRIPTION

Figure 1:
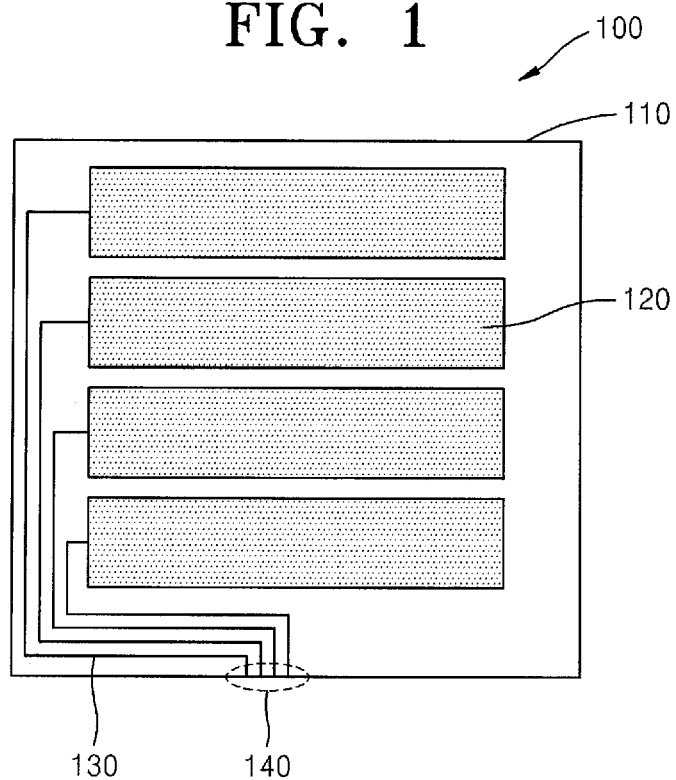
FIG. 1 is a top view of a conventional touch screen panel.

Reference will now be made in detail to embodiments of the present invention, examples of which are illustrated in the accompanying drawings, wherein like reference numerals refer to the like elements throughout. In this regard, the described embodiments may have different forms, and should not be construed as being limited to the descriptions set forth herein. Accordingly, the embodiments are merely described below, by referring to the figures, to explain aspects of the present invention. The terminology used in the specification is used only for purposes of description, and is not intended to limit the present invention. In the specification, an expression in the singular includes an expression in the plural unless they are clearly indicated otherwise from the context. The terms "comprises" and/or "comprising," when used in this specification, specify the presence of stated elements, steps, operations, and/or devices, but do not preclude the presence or addition of one or more other elements, steps, operations, and/or devices. Though terms such as "first" and "second" are used to describe various elements, the elements are not limited to these terms, which are used only to differentiate an element from another element.

As used herein, expressions such as "at least one of," when preceding a list of elements, modify the entire list of elements, and do not modify the individual elements of the list.

Figure 2:
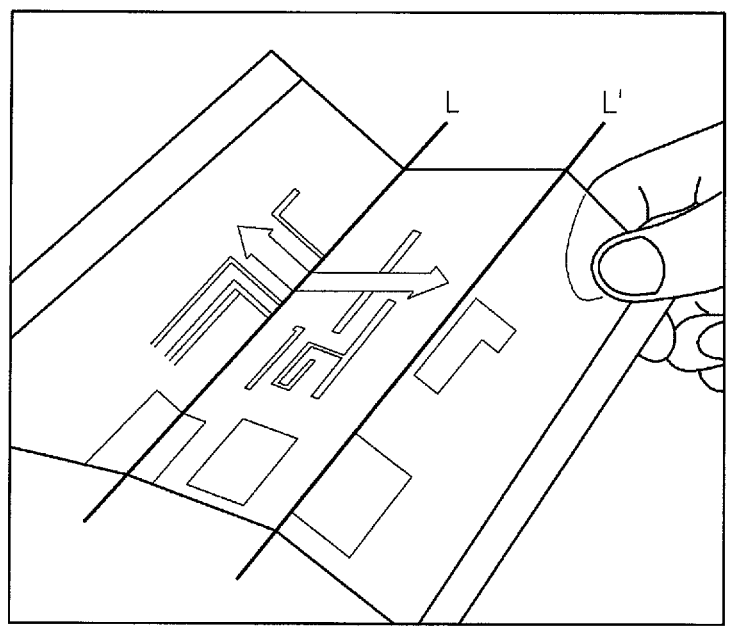
FIG. 2 is a perspective view of a folded display apparatus to which a foldable touch screen panel according to embodiments of the present invention is applied.

FIG. 2 is a perspective view of a folded display apparatus to which a foldable touch screen panel according to embodiments of the present invention is applied. As shown in FIG. 2, the foldable touch screen panel may be folded in designated areas (foldable axes L and L'), instead of being folded at any area of the foldable touch screen panel. For example, embodiments of the present invention may be folded at a center of the screen, or may be folded in thirds, or may be folded at an icon area located at an edge of the screen, or the like.

Thus, to satisfy the folded form of the screen, flexible sensing electrodes (e.g., electrodes for sensing a contact/touch/user input) may be formed at a designated folding area/region/line.

Figure 3:
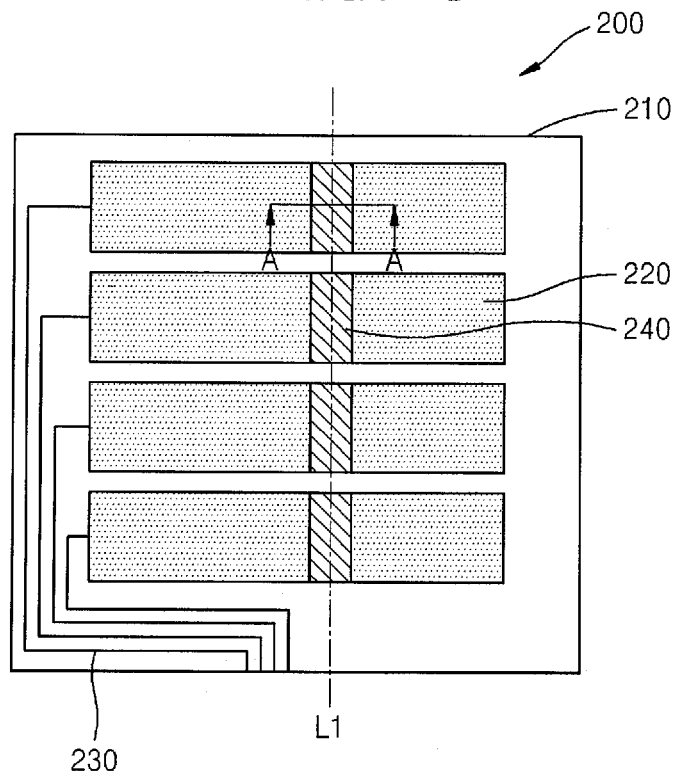
FIG. 3 is a top view of a foldable touch screen panel according to an embodiment of the present invention.

FIG. 3 is a top view of a foldable touch screen panel 200 according to an embodiment of the present invention. Referring to FIG. 3, the foldable touch screen panel 200 of the present embodiment may include a thin film substrate 210 formed of a polymer resin. For panels used for foldable or flexible display apparatuses, a film type substrate formed of a polymer resin may be used instead of a glass substrate to achieve greater flexibility. In the present embodiment, the thin film substrate 210 may be about 0.01 mm to about 1 mm thick, and may therefore bendable/foldable. The polymer resin for forming the thin film substrate 210 may be selected from at least one of polycarbonate (PC), polyethylene terephthalate (PET), cyclicolefinpolymer (COP), plyethersulfone (PES), polyimide (PI), polyethylenenaphthalate (PEN), polyarylate (PAR), cross-linked epoxy, and cross-linked urethane in consideration of flexibility, heat-resistance, and chemical resistance.

The thin film substrate 210 of the present embodiment may be divided into an active area having sensing electrodes therein and for displaying an image, and a non-active area including a plurality of metallic wirings 230 outside the active area.

A sensing electrode part may include a plurality of sensing electrodes formed as a pattern on one or both surfaces of the thin film substrate 210. The sensing electrode part may be divided into a foldable area 240, and a non-foldable area 220. In this case, the foldable touch screen panel 200 may be formed to be folded along a folding axis L1 located in the foldable area 240, and a bend of the foldable touch screen panel 200 that is folded in the foldable area 240 may have a radius of curvature of about 10 mm or less.

If the foldable touch screen panel 200 is folded, instead of gently curved, the plurality of sensing electrodes may crack or break in the foldable area 240 due to stress. When the plurality of sensing electrodes are formed of a transparent conductive material, such as ITO, the foldable touch screen panel 200 lacks flexibility, and may therefore experience the issue of sensing electrodes cracking or breaking. To reduce or prevent the cracking or breaking described above, a surface resistance of each of the plurality of sensing electrodes may be about 500 Ω/sq or less.

Thus, the foldable area 240 and the non-foldable area 220 may be formed of different materials. That is, in the sensing electrode part, the electrode pattern in the non-foldable area 220 may be formed of an ITO having good optical and electrical characteristics, while the electrode pattern in the foldable area 240 may be formed of a different material having good flexibility. By using different electrode materials in the foldable area 240 and the non-foldable area 220, the foldable touch screen panel 200 may be folded in the foldable area 240 with a desired bend, and simultaneously, optical characteristics, such as visibility, transmissivity, and the like, may be secured in the non-foldable area 220 occupying a majority of the foldable touch screen panel 200, thereby minimizing degradation in image quality of the screen overall.

Electrode materials used in the foldable area 240 and the non-foldable area 220 of the sensing electrode part, and a structure of locating the electrode materials will now be described in detail.

Figure 4:
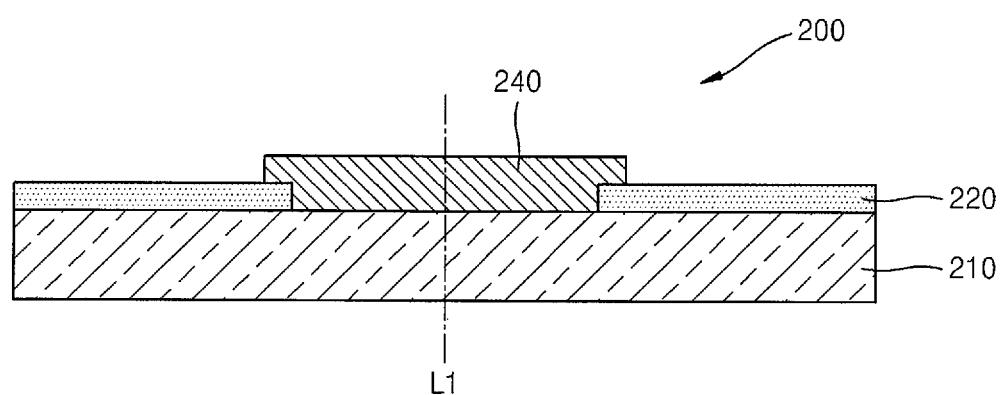
FIGS. 4 to 6 are cross-sectional views along the line A-A' of FIG. 3 according to different embodiments of the present invention.

FIG. 4 is a cross-sectional view along the line A-A' of FIG. 3 according to an embodiment of the present invention. Referring to FIG. 4, in the foldable touch screen panel 200 of the present embodiment, the plurality of sensing electrodes in the non-foldable area 220 may be formed of an ITO, and the plurality of sensing electrodes in the foldable area 240 may be formed of a flexible material.

In detail, according to a stacking order thereof, a pattern of a plurality of electrodes may be formed by sputtering an ITO on one or both surfaces of the thin film substrate 210 formed of a polymer resin. Next, a pattern of the plurality of metallic wirings 230 may be formed through, for example, a photolithography process or a printing process. In such cases, the photolithography process may be performed by a masking process including a series of unit processes, such as coating a photoresist (PR), light-exposure using a light exposure mask, developing the light-exposed photoresist, etching, stripping, and the like. The printing process may be performed using a screen printing scheme, a gravure printing scheme, or the like. Thereafter, an ITO layer formed on the thin film substrate 210 in the foldable area 240 is removed. After coating a flexible material that is an electrode material on the thin film substrate 210, the flexible material formed in the non-foldable area 220 may be removed, while the flexible material formed in the foldable area 240 by the photolithography process or the printing process remains. In other embodiments of the present invention, the stacking order of the ITO and the flexible material may be changed.

Figure 5:
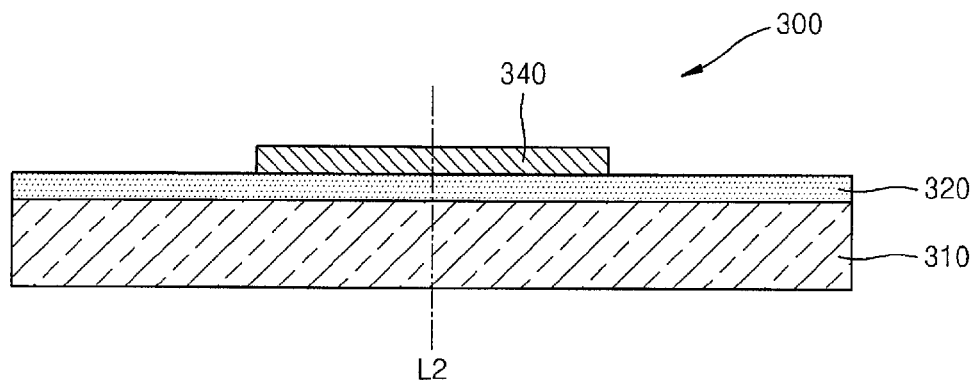

FIG. 5 is a cross-sectional view along the line A-A' of FIG. 3 according to another embodiment of the present invention. Referring to FIG. 5, in a foldable touch screen panel 300 of the present embodiment, a plurality of sensing electrodes in a non-foldable area 320 may be formed of an ITO, and a plurality of sensing electrodes in a foldable area 340 may be formed of a stacked structure of an ITO and a flexible material. In the present embodiment, even though cracking or breaking may occur in the ITO formed in the foldable area 340, an electrical signal may still be delivered via the flexible material. A stacking order of electrode materials will now be described while focusing on differences from the embodiment described above.

That is, there is a difference between the embodiments shown in FIGS. 4 and 5 in that a flexible electrode material is coated on a thin film substrate 310 without removing an ITO layer formed on the thin film substrate 310 (e.g., in the foldable area 340). Thereafter, by removing the flexible material formed in the non-foldable area 320 while not removing the flexible material formed in the foldable area 340, the plurality of sensing electrodes in the foldable area 340 have a structure where the ITO and the flexible material are stacked. Like the embodiment described above, the stacking order of the ITO and the flexible material may be changed (e.g., reversed).

Figure 6:
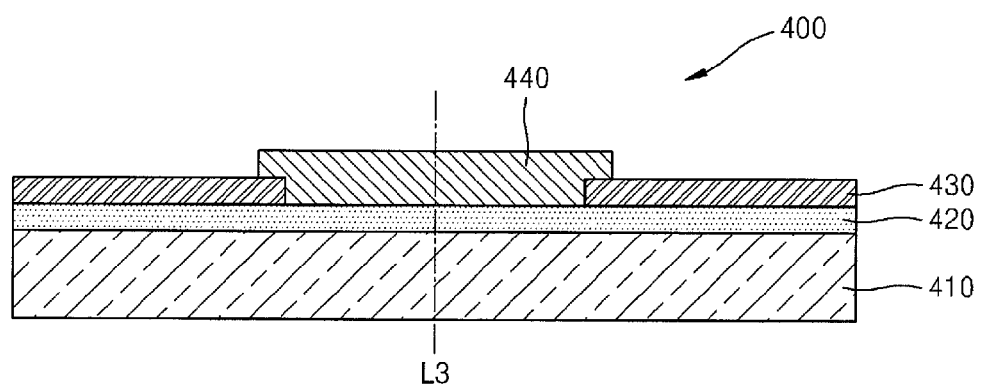

FIG. 6 is a cross-sectional view along the line A-A' of FIG. 3 according to another embodiment of the present invention. Referring to FIG. 6, in a foldable touch screen panel 400 of the present embodiment, a plurality of sensing electrodes in a non-foldable area 420 may be formed of an ITO, and a plurality of sensing electrodes in a foldable area 440 may be formed in a structure where an ITO and a flexible material are stacked with an overcoat layer 430 interposed therebetween. As such, by forming the plurality of sensing electrodes using the ITO and by further forming the overcoat layer 430 of an acryl or silicon group before stacking the flexible material thereon, an electrode pattern may be formed using the flexible material. A stacking order of electrode materials will now be described while focusing on differences from the previously described embodiments.

That is, the embodiments described above with reference to FIGS. 4 and 5 have an electrode pattern formed of an ITO on the thin film substrate 210/310 with a flexible material stacked on and contacting the ITO. However, when the flexible material is removed from the non-foldable area 220/320, while not being removed from the foldable area 240 or 340, after the photolithography process, the ITO that is intended to remain in the non-foldable area 220/320 may also be etched by an etchant for the flexible material. Applying the etchants for the ITO and the etchants for the flexible material separately may cause the number of processes and the process costs to increase.

Thus, by interposing the overcoat layer 430 between the ITO and the flexible material, as described above, the pattern of the flexible material may be etched without affecting the pattern of the ITO in the non-foldable area 420. Like the embodiments described above, the stacking order of the ITO and the flexible material may be changed.

The flexible material in the embodiments of FIGS. 4 to 6 may be, for example, any one of a silver nanowire (AgNW), a carbon nanotube (CNT), and graphene. The flexible material, such as the AgNW, the CNT, graphene, or the like, has aspects of strength, resistance against deformation, and maintaining its electrical characteristics whether the material is folded or unfolded. Although the flexible material has somewhat lower optical characteristics when compared to the ITO, such as visibility, transmissivity, and the like, a surface resistance of the flexible material does not increase by more than about 30% even when the flexible material is folded and unfolded from about 100,000 to about 2,000,000 times. Contrarily, a surface resistance of the ITO may increase by more than about 30% when a similar test is performed thereto, and cracking or breaking may occur in the ITO.

Figure 7:
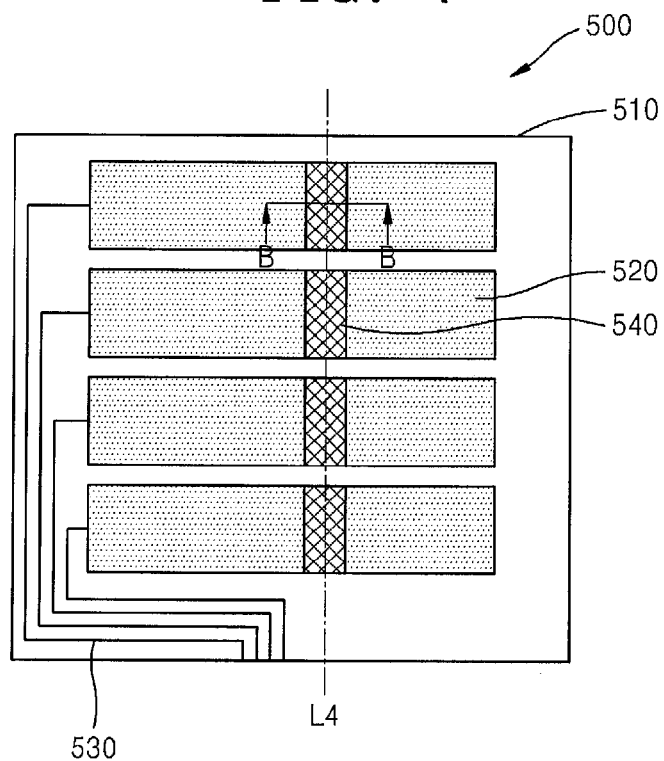
FIG. 7 is a top view of a foldable touch screen panel according to another embodiment of the present invention.
Figure 8:
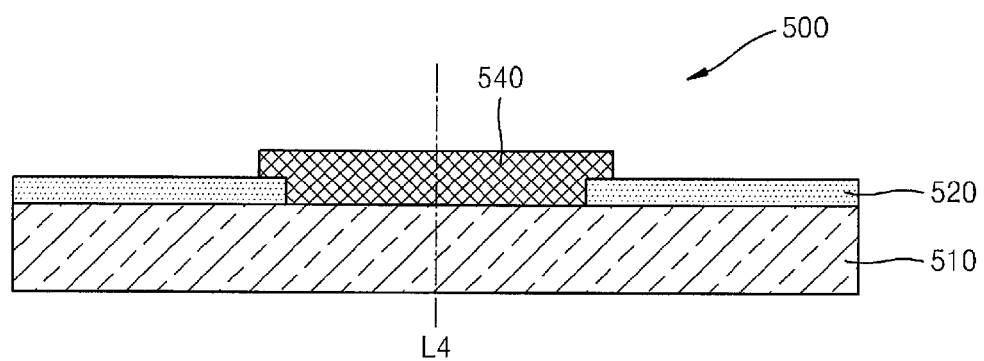
FIG. 8 is a cross-sectional view along the line B-B' of FIG. 7 according to an embodiment of the present invention.

FIG. 7 is a top view of a foldable touch screen panel 500 according to another embodiment of the present invention. FIG. 8 is a cross-sectional view along the line B-B' of FIG. 7 according to an embodiment of the present invention. Referring to FIGS. 7 and 8, in the foldable touch screen panel 500 of the present embodiment, a plurality of sensing electrodes in a non-foldable area 520 may be formed of an ITO, and a plurality of sensing electrodes in a foldable area 540 may be formed of a metal. In the present embodiment, the plurality of sensing electrodes in the foldable area 540 may be in a mesh shape with fine metal wires. The mesh shape may be a simple net shape, or may be any shape in which the fine wires of the metal are interlaced with each other. When the sensing electrodes are formed in a net shape by using a metal, a resistance between respective ones of the sensing electrodes, or a resistance between the sensing electrodes and metallic wirings 530, may decrease, thereby improving conductivity and detection strength of the foldable touch screen panel 500.

In addition, each of the fine wires of the metal may have a line width of about 10 μm or less. This may be an appropriate value when considering the surface resistance of the plurality of sensing electrodes, and when considering visibility of an electrode pattern due to a transmissivity difference between areas where sensing electrode are formed and areas where they are not formed. A stacking order of electrode materials will now be described while focusing on differences from the present embodiments and previously described embodiments.

A pattern of a plurality of electrodes is formed of an ITO on one or both surfaces of a thin film substrate 510 formed of a polymer resin. Next, a pattern of the plurality of metallic wirings 530 is formed through a photolithography process or a printing process. Thereafter, an ITO layer formed on the thin film substrate 510 in the designated foldable area 540 is removed. Thereafter, a mesh-shaped electrode pattern is formed of a metal, which is an electrode material, in a fine wire form in the foldable area 540 from which the ITO has been removed. In this case, the metal sensing electrodes and the metallic wirings 530 may be formed of a same metal or alloy, and accordingly, a process of manufacturing the foldable touch screen panel 500 may be simplified.

The metal may be any one of low-resistance metals, such as silver (Ag), aluminum (Al), copper (Cu), chromium (Cr), nickel (Ni), and molybdenum (Mo), or an alloy thereof.

Hereinafter, a metallic wiring part and a connection part 140 of a foldable touch screen panel of an embodiment of the present invention will be described. Since the components described may be the same as those shown in FIG. 1, the same reference numerals used in FIG. 1 are used for the purpose of convenience of description.

In the foldable touch screen panel 100, metallic wirings 130 of the metallic wiring part may be one-to-one/respectively coupled to sensing electrodes 120 of a sensing electrode part. The plurality of metallic wirings 130 may be gathered and coupled to an external circuit substrate through the connection part 140 in a direction of a folding axis (e.g., L1, L2, L3, or L4) of the foldable area (e.g., 240, 340, 440, or 540).

The plurality of metallic wirings 130 may be formed of the same metallic material as the plurality of sensing electrodes 120.

Schemes of implementing a touch screen panel may be largely classified into a resistive scheme and a capacitive scheme. The resistive scheme delivers a contact signal when upper and lower plates coated with a conductive material contact each other due to a pressure applied thereto, and may contact each other when a panel is folded such that facing screens contact each other. Thus, the capacitive scheme is applied to the foldable touch screen panel (e.g., 200, 300, 400, or 500) of embodiments of the present invention, and when a contact object, such as a user's hand, a pen, or the like, contacts the foldable touch screen panel, a change in capacitance according to a contact position may be delivered from a corresponding sensing electrode 120 to a circuit substrate via a corresponding metallic wire 130 and the connection part 140. Accordingly, the change in capacitance is converted into an electrical signal by an X and Y input processing circuit, and thus, the contact position may be detected.

Thus, the foldable touch screen panels 200, 300, 400, and 500 may be flexibly folded in a designated area/foldable area (e.g., 240, 340, 440, or 540) thereof.

As described above, according to the one or more of the above embodiments of the present invention, a foldable touch screen panel may be flexibly folded in a designated area. That is, the foldable touch screen panel may have improved flexibility of sensing electrodes when compared to conventional touch screen panels, thereby reducing or preventing cracking or breaking of the sensing electrodes caused by folding the foldable touch screen panel.

It should be understood that the exemplary embodiments described herein should be considered in a descriptive sense only, and should not be considered for purposes of limitation. Descriptions of aspects within each embodiment should typically be considered as available for other similar aspects in other embodiments.

While one or more embodiments of the present invention have been described with reference to the figures, it will be understood by those of ordinary skill in the art that various changes in form and details may be made therein without departing from the spirit and scope of the present invention as defined by the following claims, and their equivalents.

What is claimed is:

1. A foldable touch screen panel comprising:
a thin film substrate comprising polymer resin;
a sensing electrode part comprising a plurality of sensing electrodes patterned on a surface of the thin film substrate; and
a metallic wiring part comprising a plurality of metallic wirings located outside the sensing electrode part and coupled to an end of the sensing electrodes,
wherein the sensing electrode part is divided into a foldable area and a non-foldable area that remains by excluding the foldable area from the sensing electrode part, and
wherein a portion of at least one of the plurality of sensing electrodes is located in the foldable area.

2. The foldable touch screen panel of claim 1, further comprising a connection part located at an edge of the thin film substrate for coupling the metallic wiring part to a circuit substrate.

3. The foldable touch screen panel of claim 2, wherein the metallic wirings are at the connection part and are coupled to the circuit substrate in a folding axis direction of the foldable area.

4. The foldable touch screen panel of claim 1, wherein a thickness of the thin film substrate is about 0.01 mm to about 1 mm.

5. The foldable touch screen panel of claim 1, wherein the polymer resin comprises at least one of polycarbonate (PC), polyethylene terephthalate (PET), cyclicolefinpolymer (COP), plyethersulfone (PES), polyimide (PI), polyethylenenaphthalate (PEN), polyarylate (PAR), cross-linked epoxy, or cross-linked urethane.

6. The foldable touch screen panel of claim 1, wherein the foldable touch screen panel is configured to fold at the foldable area.

7. The foldable touch screen panel of claim 1, wherein a bend of the foldable area, when folded, has a radius of curvature of about 10 mm or less.

8. The foldable touch screen panel of claim 1, wherein a surface resistance of each of the sensing electrodes at the foldable area is about 500 Ω/sq or less.

9. The foldable touch screen panel of claim 1, wherein the foldable area and the non-foldable area comprise different materials.

10. The foldable touch screen panel of claim 1, wherein the sensing electrodes at the non-foldable area comprise indium tin oxide (ITO), and wherein the sensing electrodes at the foldable area comprises a flexible material.

11. The foldable touch screen panel of claim 10, wherein the flexible material comprises any one of a silver nanowire (AgNW), a carbon nanotube (CNT), or graphene.

12. A foldable touch screen panel comprising:
a thin film substrate comprising polymer resin;
a sensing electrode part comprising a plurality of sensing electrodes patterned on a surface of the thin film substrate; and
a metallic wiring part comprising a plurality of metallic wirings located outside the sensing electrode part and coupled to an end of the sensing electrodes,
wherein the sensing electrode part is divided into a foldable area and a non-foldable area that remains by excluding the foldable area from the sensing electrode part,
wherein the sensing electrodes at the non-foldable area comprise ITO, and
wherein the sensing electrodes at the foldable area comprise ITO stacked with a flexible material.

13. The foldable touch screen panel of claim 12, wherein the flexible material comprises any one of a silver nanowire (AgNW), a carbon nanotube (CNT), or graphene.

14. A foldable touch screen panel comprising:
a thin film substrate comprising polymer resin;
a sensing electrode part comprising a plurality of sensing electrodes patterned on a surface of the thin film substrate; and
a metallic wiring part comprising a plurality of metallic wirings located outside the sensing electrode part and coupled to an end of the sensing electrodes,
wherein the sensing electrode part is divided into a foldable area and a non-foldable area that remains by excluding the foldable area from the sensing electrode part,
wherein the sensing electrodes at the non-foldable area comprise ITO, and
wherein the sensing electrodes at the foldable area comprise a structure of ITO stacked with a flexible material with an overcoat layer therebetween.

15. The foldable touch screen panel of claim 14, wherein the flexible material comprises any one of a silver nanowire (AgNW), a carbon nanotube (CNT), or graphene.

16. A foldable touch screen panel comprising:
a thin film substrate comprising polymer resin;

a sensing electrode part comprising a plurality of sensing electrodes patterned on a surface of the thin film substrate; and a metallic wiring part comprising a plurality of metallic wirings located outside the sensing electrode part and coupled to an end of the sensing electrodes, wherein the sensing electrode part is divided into a foldable area and a non-foldable area that remains by excluding the foldable area from the sensing electrode part, wherein the sensing electrodes at the non-foldable area comprise ITO, and wherein the sensing electrodes at the foldable area comprise metal.

17. The foldable touch screen panel of claim 16, wherein the sensing electrodes at the foldable area comprise a mesh shape with fine wires of the metal.

18. The foldable touch screen panel of claim 17, wherein each of the fine wires has a width of about 10 μm or less.

19. The foldable touch screen panel of claim 16, wherein the metal is any one of silver (Ag), aluminum (Al), copper (Cu), chromium (Cr), nickel (Ni), or molybdenum (Mo), or an alloy thereof.

20. The foldable touch screen panel of claim 1, wherein the metallic wirings are coupled to respective ones of the sensing electrodes.

* * * * *